Figure 5:
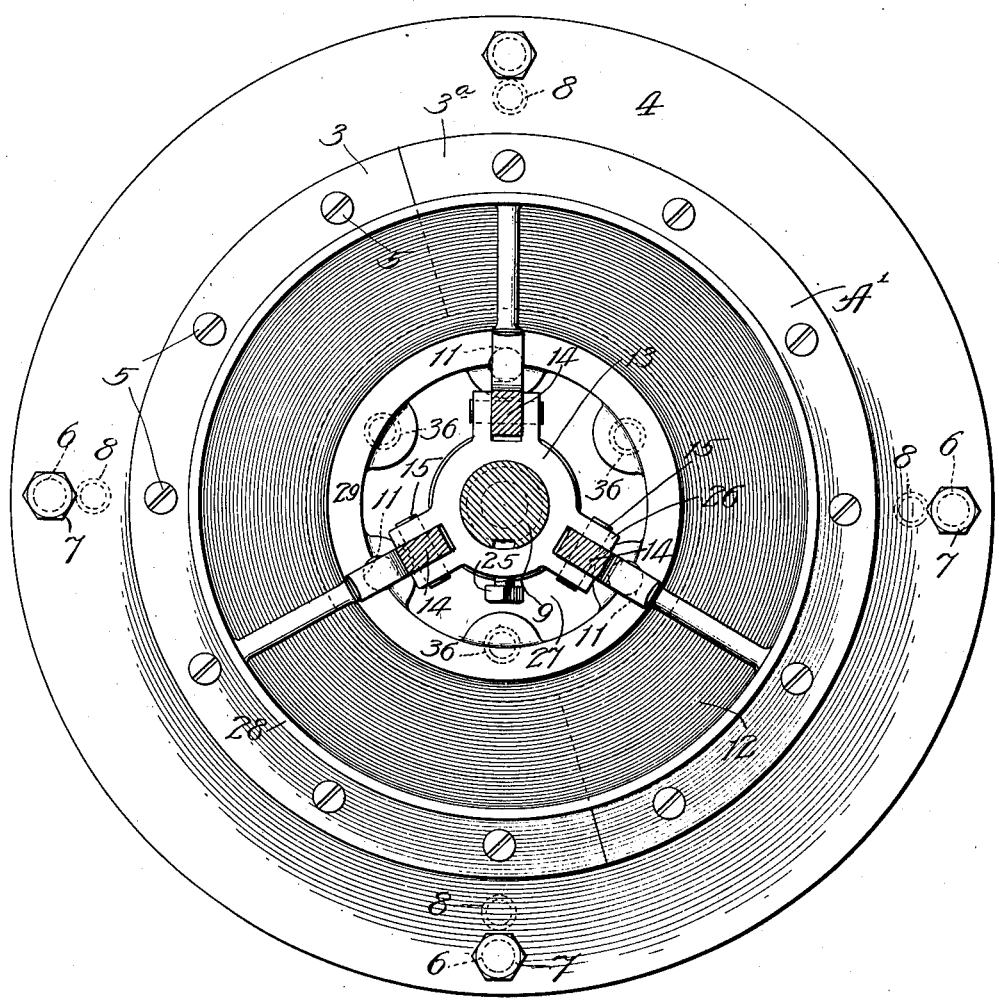

J. LAUTH.
CLUTCH MECHANISM.
APPLICATION FILED FEB. 8, 1912.
1,091,149.
Patented Mar. 24, 1914.
3 SHEETS—SHEET 1.
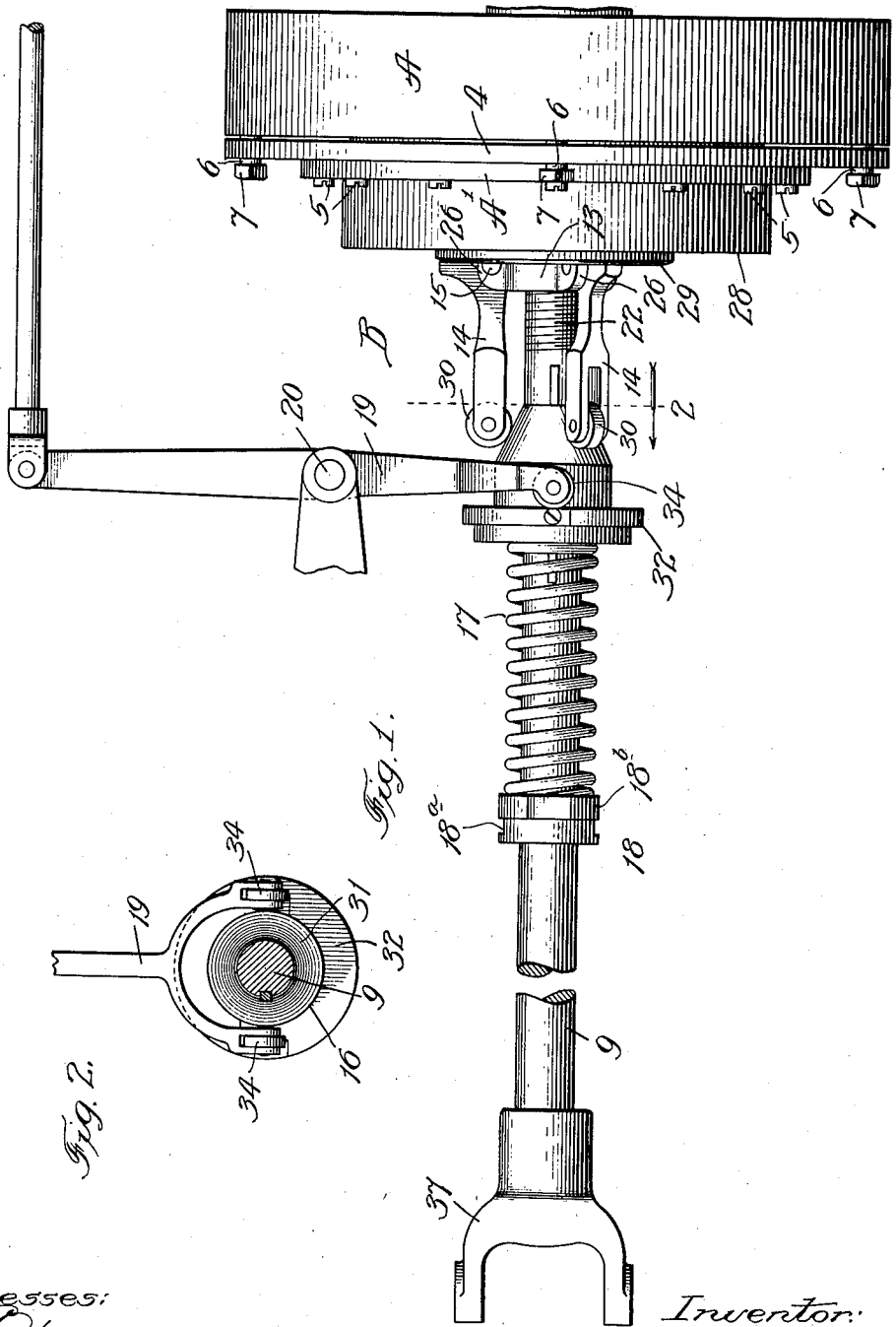

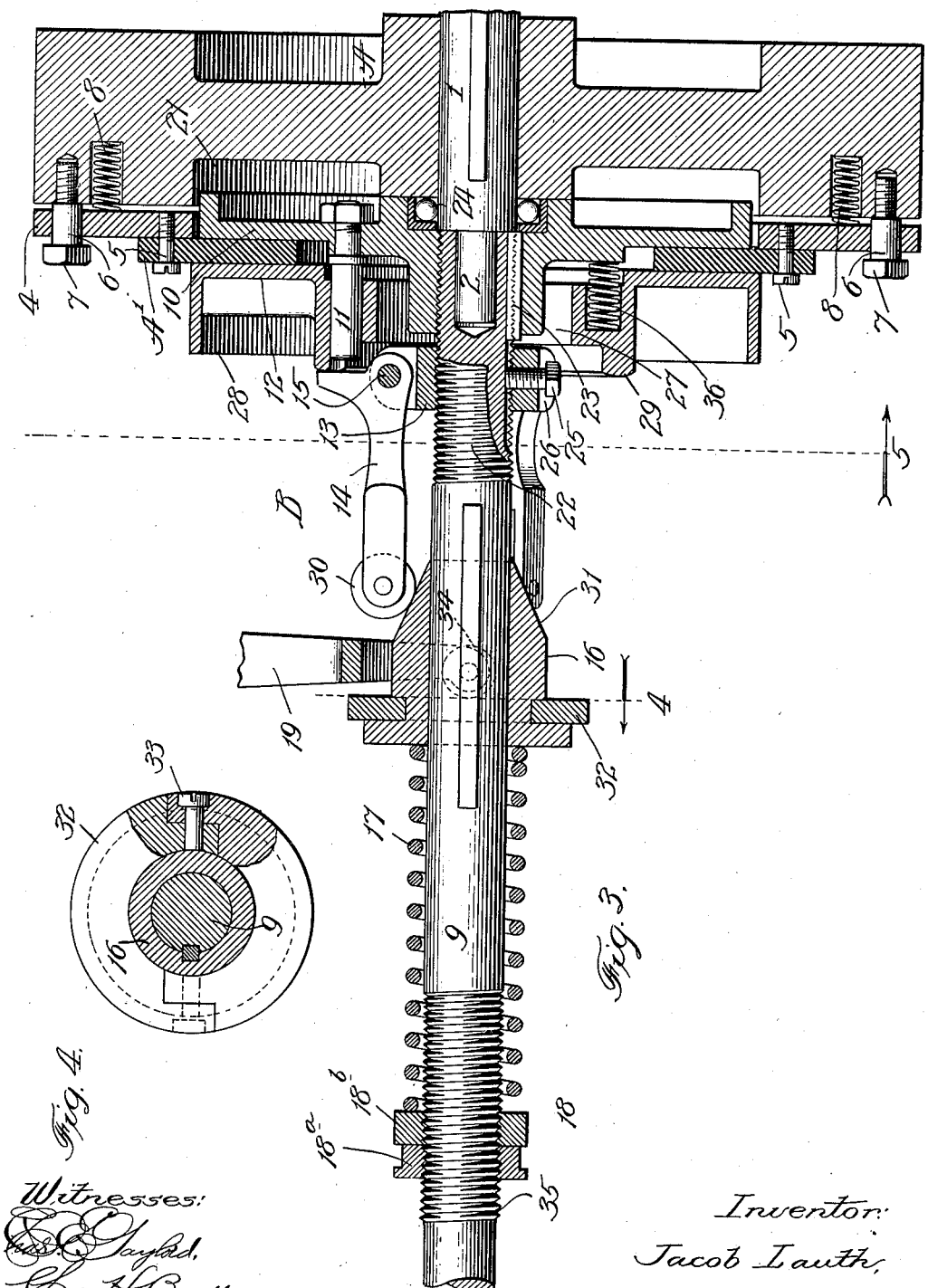

J. LAUTH.
CLUTCH MECHANISM.
APPLICATION FILED FEB. 8, 1912.

1,091,149.

Patented Mar. 24, 1914.
3 SHEETS—SHEET 3.

Witnesses:

Inventor:
Jacob Lauth,
By Dyrenforth, Lee, Chritton and Wiles,
Attys.

UNITED STATES PATENT OFFICE.

JACOB LAUTH, OF CHICAGO, ILLINOIS.

CLUTCH MECHANISM.

1,091,149. Specification of Letters Patent. Patented Mar. 24, 1914.

Application filed February 8, 1912. Serial No. 676,212.

*To all whom it may concern:*

Be it known that I, JACOB LAUTH, a citizen of the United States, residing at Chicago, in the county of Cook and State of Illinois, have invented a new and useful Improvement in Clutch Mechanism, of which the following is a specification.

My invention relates particularly to clutch mechanism adapted for automobile or motor-vehicle use.

My primary object is to provide improved clutch mechanism of durable construction, ready adjustment and small liability to get out of order.

The invention is illustrated in its preferred embodiment in the accompanying drawings, in which—

Figure 1 represents a broken elevational view of clutch mechanism embodying my invention; Fig. 2, a sectional view taken as indicated at line 2 of Fig. 1; Fig. 3, a broken longitudinal sectional view; Fig. 4, a broken sectional view taken as indicated at line 4 of Fig. 3; and Fig. 5, a section taken as indicated at line 5 of Fig. 3.

In the illustration given, A represents a wheel, such as the fly-wheel of an engine, equipped with an annular friction disk A′; and B, mechanism equipped with clamping members between which the member A′ is normally clamped.

The wheel A is fixedly mounted on a shaft 1, which has a reduced extension 2. The annular friction disk A′ preferably comprises two ring-sections 3 and 3ª which are fixedly secured to an annular plate 4, as by means of cap-screws 5. The annular plate, or ring, 4 is mounted on studs 6 which project from the rear face of the rim portion of the wheel A and have heads 7 between which and the adjacent face of the wheel the plate 4 can play. Springs 8 confined in sockets with which the wheel A is provided tend to force the plate 4 away from the wheel. As thus mounted, the friction disk A′ will, of course, rotate with the wheel A by which it is carried.

The mechanism B comprises a shaft 9 having its front or inner end provided with a socket or bore which is journaled on the shaft-extension 2; a clamping-member 10 which is fixedly secured on the front end of the shaft 9 and equipped with rearwardly projecting guide studs 11; a clamping member 12 between which and the clamping member 10 is interposed the inner peripheral portion of the friction plate A′, said member 12 having perforations which receive the studs 11; a lever-carrying member 13 adjustably secured on the shaft 9 adjacent the clamping member 12; bell-crank levers 14 mounted on pivots 15 with which the adjustable member 13 is equipped; a lever-actuating member 16 splined on the shaft 9 and normally holding the levers 14 in position to force the clamping member 12 against the member A′; a coil-spring 17 encircling the shaft 9 and serving to hold the member 16 in the operative position; a bearing 18 for the rear end of the spring, which is adjustably mounted on the shaft 9; and a lever or yoke 19 mounted on a pivot 20 and adapted to retract the member 16 against the force of its spring.

The face of the wheel A is recessed, as indicated at 21, to accommodate the clamping member 10. The inner end of the shaft 9 is provided with a thread, as indicated at 22. The clamping member 10 is in the form of a disk having a hub portion with a threaded bore which is screwed on the extreme threaded portion of the shaft 9 and additionally secured by a key 23. A ball-bearing 24 is preferably interposed between the member 10 and the hub of the wheel A. The mounting 13 for the levers is preferably in the form of a sleeve or collar which has a threaded bore which screws on the thread 22; and the member 13 may be secured in adjusted position by a set-screw 25. The member 13 is equipped with slotted radial lugs, or ears, 26 in which the knee portions of the bell-crank levers are mounted on the pivots 15.

The clamping member 12 is in the form of a disk having a central opening 27 adapted to accommodate freely the hub portion of the disk 10. The disk 12 is suitably reinforced, and has an outer annular flange 28 and an inner annular flange 29 constituting an extension of its hub. The short arms of the bell-crank levers bear against the flange 29. The long arms of the bell-crank levers are equipped with rollers 30 which bear upon the inclined surface or surfaces 31 of the member 16. Thus the member 16 serves as a wedge or cone which is adapted to force apart the long arms of the members 14. The member 16 is equipped with an annular bearing-plate 32 which is preferably composed of two sections which are united by screws 33, as shown in Fig. 4. The lever 19 has a forked arm equipped with rollers 34 which bear against the front surface of the member 32. The member 19 may be actuated by a foot-treadle (not shown) to retract the member 16 against the force of its spring. The adjustable bearing 18 comprises an annular nut 18ª mounted on the threaded portion 35 of the shaft 9, and a washer 18ᵇ interposed between the nut and the spring.

It is evident that the spring 17 tends to force the member 16 toward the clamping members, thus tending to swing the long arms of the levers 14 outwardly and forcing the clamping member 12 toward the clamping member 10. In this manner, the member A' is securely clamped between the clamping members 10 and 12. Inasmuch as the member 12 rotates with the member 10, there is comparatively little wearing action between the short arms of the bell-crank levers 14 and the flange 29. Any wear between the member A' and the clamping members may be compensated for by adjusting the member 13, that is, by turning it upon the threaded portion 22 of the shaft 9, the set-screw 25 being loosened to permit the adjustment. It is noted that when the member 13 is adjusted the pivots for all of the levers 14 are simultaneously shifted to the same extent, from which it follows that the clamping action of the member 12 will be uniform in any position of adjustment of the member 13. Otherwise stated, the levers 14 will all have their pivots disposed in the same transverse plane in any position of adjustment of the member 13.

When the member 16 is retracted through the medium of the lever 19, the clamping member 12 is retracted by means of springs 36 mounted in sockets with which the face of the member 12 is provided and interposed between the members 12 and 10. Thus, the friction-disk A' will be carried free from both of the clamping members 10 and 12 when the clutch is disengaged.

The mechanism may occupy any desired relation to the engine and transmission mechanism of the automobile. In the illustration given, the rear end of the shaft 9 is equipped with a knuckle 37 which forms one member of a universal joint adapted to connect the shaft 9 to the main shaft, or driving shaft, of the transmission mechanism—that is, speed-changing gear mechanism.

For greater flexibility of the clutch mechanism, I prefer to form the friction member A' of a vulcanized composition of rubber, which may be composed of rubber, graphite, metal filings and asbestos. Any suitable composition adapted to withstand a high degree of heat is well adapted to the purpose. The use of a friction member of such composition is advantageous, inasmuch as it enables the operator to slip the clutch in starting the machine, without injury to the friction member from the heat developed. By constructing the member A' in sections which are removably attached in the manner illustrated, a new member may be inserted without difficulty, when occasion requires.

The foregoing detailed description has been given for clearness of understanding only, and no undue limitation should be understood therefrom, but the appended claims should be construed as broadly as permissible in view of the prior art.

What I regard as new and desire to secure by Letters Patent is—

1. In clutch-mechanism, the combination of a shaft, a clamping-member secured on one end thereof, a clamping-member shiftably mounted on said shaft, a wheel equipped with a friction-member which projects between said clamping members, means tending to move said friction-member away from said first-named clamping member, a lever-carrying member adjustably fixed on said shaft adjacent said second-named clamping-member, levers mounted thereon and adapted to force said second-named clamping member to the clamping position, and a lever-actuating member shiftably mounted on said shaft.

2. In clutch-mechanism, the combination of a shaft, a clamping-member secured on one end thereof, a clamping-member shiftably mounted on said shaft and connected to rotate therewith, a wheel equipped with a friction-member which projects between said clamping-members, means tending to move said friction-member away from said first-named clamping member, a lever-carrying member adjustably fixed on said shaft adjacent said second-named clamping-member, levers mounted thereon and adapted to force said second-named clamping-member to the clamping position, and a lever-actuating member shiftably mounted on said shaft.

3. In clutch-mechanism, the combination of a shaft equipped at one end with a wheel, a friction-member mounted at one side of the rim portion of said wheel to rotate with the wheel, but capable of movement away from the wheel, springs adapted to force said friction-member away from the wheel, a second shaft in alinement with said first-named shaft, a clamping-member secured on the end portion of said second-named shaft between said friction-member and said wheel, a second clamping-member on the opposite side of said friction-member and mounted to rotate with said first-named clamping-member, but movable toward and away therefrom, springs for separating said clamping-members, a lever-carrying member disposed adjacent said second-named clamping-member and adjustably mounted on said second-named shaft, a lever-actuating member slidably mounted on said shaft, and a spring carried by said shaft and engaging said lever-actuating member.

4. In clutch-mechanism, the combination of a shaft equipped at one end with a wheel, a friction-member mounted at one side of the rim portion of said wheel to rotate with the wheel, but capable of movement away from the wheel, springs adapted to force said friction-member away from the wheel, a second shaft in alinement with said first-named shaft, a clamping-member secured on the end portion of said second-named shaft between said friction-member and said wheel, a second clamping-member on the opposite side of said friction-member and mounted to rotate with said first-named clamping-member, but movable toward and away therefrom, springs for separating said clamping-members, a lever-carrying member disposed adjacent said second-named clamping-member and adjustably mounted on said second-named shaft, levers mounted on said lever-carrying member, a lever-actuating member slidably mounted on said shaft, a spring carried by said shaft and engaging said lever-actuating member, and means for retracting the lever-actuating member against the force of its spring.

5. In clutch-mechanism, the combination of a shaft having one end portion equipped with threads, a lever-carrying sleeve having a threaded bore engaging said threads, levers mounted on said lever-carrying sleeve, a clamping-member having a threaded bore engaging the threaded extremity of said shaft, a clamping-member between said levers and said first-named clamping-member, guide-connections between said clamping members permitting movement of the second-named clamping-member away from the first-named clamping-member, spring-held lever-engaging means mounted on said shaft, and a wheel equipped with an annular friction-member projecting into the space between said clamping members.

JACOB LAUTH.

In presence of—
JOHN WILSON,
R. SCHAEFER.